Patented Aug. 28, 1923.

1,466,628

UNITED STATES PATENT OFFICE.

KARL P. McELROY, OF WASHINGTON, DISTRICT OF COLUMBIA, ASSIGNOR TO FERRO CHEMICALS INC., OF WASHINGTON, DISTRICT OF COLUMBIA, A CORPORATION OF DELAWARE.

MANUFACTURE OF ALKALI AND CHEMICALS.

No Drawing.   Application filed January 23, 1923.   Serial No. 614,482.

*To all whom it may concern:*

Be it known that I, KARL P. McELROY, a citizen of the United States, residing at Washington, in the District of Columbia, have invented certain new and useful Improvements in the Manufacture of Alkali and Chemicals, of which the following is a specification.

This invention relates to the manufacture of alkali and chemicals; and it comprises a process wherein excess energy of a blast furnace making iron is utilized to do useful chemical work in the conversion of various forms of alkali-containing material into other forms, in recovering alkalis in valuable commercial form and in forming oxalates and other salts of carbon acids; and, more specifically, it comprehends a process wherein cyanid which may be and usually is produced in blast furnaces, or which is much the same thing for present purposes, in a slagging gas producer, but which may be produced elsewhere, is steamed at a high temperature to produce oxalates, such oxalates being subsequently utilized in various ways in the production of useful alkali, and oxalic acid; all as more fully hereinafter set forth and as claimed.

A blast furnace producing iron or ferro-alloys may be and often is regarded as two inter-dependent and correlated but different pieces of apparatus with different functions: a shaft wherein iron ores are reduced, limestone calcined and the charge preheated; and the hearth wherein the reduced iron is melted and carburized, alloying constituents of the metal reduced, slag made and melted and separated from the metal. Now as it happens, the energy requirements of these two pieces of apparatus are somewhat different. The amount of fuel which is necessary to maintain the hearth temperature plane at the necessary high point of 1400 or 1500° C. and deliver the necessary heat units to the hearth materials at such temperature, is larger, and considerably larger than that required to furnish reducing gases and heat for the work to be done in the shaft. As a result, much of the energy supplied to the blast furnace again escapes with the top gases; partly in the form of latent combustion energy in CO and partly in the form of heat. Usually, in making the ordinary grades of pig iron the surplus energy constitutes at least one half of the total combustion energy of the coke used as fuel; at best the equivalent of not over 30 per cent of the fuel carbon being converted to $CO_2$. In making ferro-alloys the surplus energy is much greater. It is the object of the present invention to utilize this excess of energy, or some portion of it, in doing useful chemical work.

As I have found, and elsewhere described and claimed, this surplus energy may be usefully employed in the manufacture of cyanids or ammonia by aid of alkali-containing material naturally present or added with the charge materials. In the present invention I take advantage of such a formation of cyanids to accomplish other desirable chemical purposes; among them being the production of oxalic acid and formic acid as by-products; the recovery of soda (sodium or $Na_2O$ compounds) and potash (potassium or $K_2O$ compounds) separately from blast furnace charge materials containing both alkalis; the production of caustic alkalis as by-products, etc. Nearly all the materials supplied to blast furnaces contain some alkali, either soda or potash, and generally both. For example, with ores containing a feldspar gangue both soda and potash are thereby added to the charge. Orthoclase feldspar should contain some 16 per cent $K_2O$ but actually it ordinarily contains 3 or 4 per cent of $Na_2O$ replacing a corresponding quantity of $K_2O$. Where the blast furnace is run under such conditions as to convert the alkalis of the charge into cyanids, these cyanids may be withdrawn from the hot zone of the furnace by withdrawing a portion of the gases therefrom. The withdrawn gases contain the cyanids as vapors or fume and by appropriate treatment the cyanids may be collected. With charge materials containing both sodium and potassium compounds both cyanids are present in the collected material. It is often expedient to add a certain amount of alkali to the charge of a furnace to supplement the alkalis naturally contained in the charge, and this added alkali is generally soda in the form of soda ash or sodium carbonate.

Whereas the presence of alkali cyanids in the hotter zones of the blast furnace making iron has been often commented upon, their thermal effect upon the furnace operation has not heretofore, so far as known, been recognized nor alluded to. As a matter of fact, the formation of cyanid vapor in the hearth of the furnace absorbs heat which is set free again in condensation and decomposition of cyanid in the shaft. This effect, which may be designated the vaporization transfer of heat, serves to account for the necessity of burning the large excess of carbon above referred to, and for the consequent surplus of energy delivered to the shaft. Due to the accumulation in the furnace of alkalis and other substances volatile at the hearth temperatures and condensable at the shaft temperatures, this vaporization transfer effect is of large weight in relation to the heat actually absorbed in that part of the smelting work proper devolving upon the hearth region. It may be said that the accumulation of alkalis sets the limit upon the smelting work that can be done by the consumption of a given weight of coke, hence upon the burden and upon the production of metal, relative to time and to coke consumption. As noted, it has been found that this condition may be turned to advantage in increasing the useful work done in a given furnace burning coke at a more or less constant rate per unit of time. The withdrawal from the furnace through outlet provided in the hot zone of a certain proportion of the vapor laden gases produced in the hearth permits of an increase in the load of useful work by way either of producing more metal or of fixing more nitrogen as cyanid or partly by way of the one and partly of the other. By adding to the furnace charge alkali compounds (potash and soda) in a proportion correlated with the proportion of hot gases withdrawn, there is maintained an accumulation of cyanids in the hot zone of any desired concentration in the materials reaching the hearth and in the gases produced there. With this concentration less than that due to the accumulation of alkalis naturally occurring in the charge, cyanid may be collected from the hot gases in amount corresponding to the natural alkali content of the charge while the burden of ore and stone may be increased and more iron made. With the natural cyanid concentration for a particular furnace maintained by the addition of alkali to the burden in correlation with the proportion of gas withdrawn, it is possible to fix as cyanid and recover from the gases an increased amount of so fixed nitrogen while maintaining the production of iron. By increasing the feed of alkali more nitrogen is fixed and less iron made. Thus pig iron or ferro alloy production and nitrogen fixation may be carried on in any desired ratio. The iron may sometimes be regarded as the byproduct. In practicing the present invention the proportion of alkali added to the charge is carefully adjusted in accordance with the particular end sought, and the blast heat and amount of hot gas withdrawn are adjusted in correlation with each other and with the proportion of alkali in the charge. Other things being equal, these three factors determine the concentration or accumulation of alkali in the furnace and the ratio of cyanid delivered to iron produced.

The cyanids collected from the withdrawn gases are not pure but are admixed with many other things such as dust originating from the charged material of the furnace, carbon and other nitrogen compounds. There is not always any very exact ratio between the nitrogen and the alkali metals in these withdrawn materials; or in other words the cyanids are not pure. For the sake of simplicity, however, the collected material may be here termed cyanid without meaning thereby to imply that it is all cyanid or even that a major fraction is cyanid. Instead of endeavoring to recover cyanids as such from the collected material, it is generally expedient to steam such material, converting the nitrogen of the cyanid into ammonia and the base into oxidized form. According to conditions of the steaming, the residual alkali compounds may be carbonate, formate or oxalate. Where conditions are so adjusted as to produce oxalates at the expense of the cyanid, oxalic acid forms a valuable byproduct; and furthermore such conversion offers a convenient means of separating potassium ($K_2O$) compounds from sodium ($Na_2O$) compounds. As noted, it is often expedient to add alkali to the charge and this alkali is usually a sodium compound. The added alkali may be some of that recovered from the collected fumes and dust; and in this event it is useful to be able to separate potassium compounds from sodium compounds. The former are of higher value than the latter and it is better to market them than to return them. In normal operation, with a charge of the ordinary kind and addition of some alkali, the added alkali may be returned soda. In other words, with a charge containing both alkalis, some portion of soda is kept circulating cyclically while potassium compounds are withdrawn and marketed; the amount of alkali returned being sufficient to preserve the accumulation desired in the furnace. As the charge is contributing both alkalis, after the alkali accumulation is once established, the output of soda will correspond to the amount in the charge as in the case of potash which is not returned.

As stated, the collected fume and dust upon steaming will give carbonate, formate or oxalate according to conditions. Formate is produced generally at temperatures below 200° and oxalate at temperatures around 200 to 450°. At higher temperatures carbonate is formed. In making oxalate the amount of steam applied should be restricted to that required to convert cyanid to oxalate (2NaCN and 4$H_2O$ giving $Na_2C_2O_4$). An undue flow of steam carries the action further and causes conversion of oxalate into carbonate. If the operation is so conducted as to form carbonates with or without oxalates, on leaching the steamed material with a little water in the presence of products of combustion containing $CO_2$, the sodium bicarbonate formed will remain with the insoluble material for the most part while the potassium compounds go into solution in carbonated form. After extracting the potassium compounds the residue may be again leached to extract sodium compounds; or the residue or a portion of it, charged directly back into the furnace. If the conversion of cyanids be carried forward in such manner as to produce oxalates, on leaching with a limited amount of water, potassium oxalate will go into solution leaving sodium oxalate behind. The residual undissolved sodium oxalate may be readily extracted by another washing with hot water. In so operating two solutions are obtained: one containing mainly potassium oxalate and the other sodium oxalate. Each may be causticized with lime giving a precipitate of calcium oxalate and a solution containing caustic alkali. Any carbonate present is similarly causticized. These solutions may be concentrated and converted into merchantable alkali in the usual way. Ordinarily when I am making caustic alkalis in this way, I do not return caustic soda to the furnace since caustic soda is commercially more valuable, per unit contained sodium than sodium carbonate and it is more economical to add more soda ash to the furnace. Looked at in this way, in the present invention, the blast furnace is a means of converting sodium carbonate into the more valuable caustic soda. In separating potash and soda via the oxalates, the precipitated calcium oxalate is treated with sulfuric acid, etc. in the usual way to make commercial oxalic acid.

As will be noted, in the foregoing matter I have described a process of utilizing the surplus energy of the blast furnace wherein such energy is employed to convert alkalis in the charge or carbonated alkalis or both into cyanids, these cyanids then broken up to give ammonia as a valuable product and a residue of an alkaline salt; this alkaline salt being then so treated as to give the two alkalis in separate form; often in the commercially valuable form of caustic alkali. Where the charged material contains either or both alkalis, the alkali is delivered in commercially valuable form. With a blast furnace handling an ore containing both potassium and sodium compounds, potash and soda are recovered in the carbonated or caustic form as valuable products separate from each other and there is a production of ammonia. In addition to these valuable products, there may be oxalic acid.

In a modification of my invention, in lieu of charging the furnace with carbonated alkali, either as soda ash or as returned alkali, I may use sodium chlorid in the charge. In this event sodium chlorid is converted via the cyanid into commercially more valuable caustic and carbonated sodium compounds; some of the carbon of the charge being converted to formic or oxalic acid.

The production of oxalates by steaming cyanids at a high temperature is novel and may, within the present invention be applied to cyanids from other sources as well as to the impure cyanid-containing materials delivered by the blast furnace or slagging gas producer. Using the latter materials, which are generally collected quite hot, the steam used for hydrolysis may also constitute a cooling means in bringing the material quickly down to the desired temperature range; and with material at very high temperatures, a water spray may be used in conjunction with, or in lieu of, steam. At the oxalate forming temperature, any water added will be steam.

In applying this invention to cyanid from other sources, the cyanid is of course heated up to the necessary temperature instead of being cooled down to it, as with hot furnace materials.

What I claim is:—

1. In the production of ammonia and salts of carbon acids by the hydrolysis of cyanid the process of producing oxalate which comprises treating the cyanid with a limited amount of steam at a temperature between 200° and 450° C.; the amount of $H_2O$ so employed being not greater than the amount theoretically required to convert cyanid into oxalate.

2. In the production of ammonia and alkali compounds through the withdrawal from the hot zone of a blast furnace of gases carrying potassium as well as sodium in the form of cyanids, the process of separating $K_2O$ from $Na_2O$ which comprises removing cyanids from the hot gases, steaming the removed cyanids at a temperature between 200° and 450° to form oxalates and thereafter leaching the steamed material with a limited amount of water, leaving sodium oxalate undissolved.

3. In the production of ammonia and salts of carbon acids as byproducts of a blast furnace producing iron or fero-alloy the process which comprises adding to the charge of ore, flux and fuel an alkali compound in a ratio correlated with the proportion of hot gases to be withdrawn, operating the furnace with a sufficiently hot blast to cause a substantial concentration of cyanid vapor in the gases of the hot zone, withdrawing a correlated proportion of such gases carrying introduced alkali combined with nitrogen of the air in the form of cyanid vapor, cooling the withdrawn gases partially to condense hot cyanid, steaming the hot condensed material, digesting the steamed material with lime and water and recovering caustic alkali.

4. In the production of ammonia and by-products by means of a blast furnace or slagging gas producer, the process which comprises charging alkali compounds with carbonaceous fuel into the furnace to be converted into cyanid vapor with nitrogen of the air blast, separating material containing cyanid from a portion of the hot gases produced in the hearth, steaming the separated material to produce ammonia and treating the steamed material with lime and water to produce caustic alkali.

5. In the manufacture of ammonia and byproducts the process which comprises air-blowing a mixture of carbon and alkali at a temperature around 1400° to form cyanid-vapor-laden producer gas, separating cyanid bearing material from a portion of such gas, steaming the separated material, and treating the steamed material with lime and water.

6. In the production of ammonia through the intermediacy of alkali cyanid formation with recovery of alkali as a by-product, the process of making caustic alkali which comprises steaming cyanid at a temperature to produce alkali salts of acids forming insoluble calcium salts and treating the steamed material with lime and water.

7. In the separate recovery of different alkalies contained in the charge materials fed to blast furnaces smelting iron, the process which comprises abstracting hot gases carrying cyanids from such furnaces, separating cyanids from such gases, steaming such cyanids to form ammonia and an oxidized residue and thereafter leaching the solid material of said residue with a limited amount of water to extract potassium compounds and leave sodium compounds undissolved.

8. The process of recovering the potassium content of silicate minerals as caustic potash which comprises charging such a silicate material into a blast furnace, tapping off hot furnace gases carrying potassium cyanid, recovering such cyanid by condensation, steaming the condensed material to convert condensed cyanids into oxalates, leaching the steamed material with a limited amount of water to bring potassium oxalate into solution and precipitating oxalic acid from the resultant solution with the aid of lime.

9. In the production of ammonia, soda and carbon acids as byproducts of a blast furnace making iron or ferroalloy the process which comprises withdrawing from the hot zone a certain proportion of the cyanid vapor laden gases produced in the hearth while adding to the charge a correlated proportion of sodium compounds, collecting from the withdrawn gases cyanid bearing material, steaming the collected material and recovering from the steamed material carbon acids and sodium in the form of alkali with the aid of lime.

10. In a simultaneous production of nitrogen compounds, alkali and carbon acids, the process which comprises hydrolyzing the dust deposited from a regulated proportion of the cyanid-vapor-laden gases produced in the hearth of a blast furnace making iron while a correlated proportion of an alkali compound is added to the charge.

11. In the production of iron, alkali, carbon acids and nitrogen compounds by means of a blast furnace the process characterized by withdrawing gases from the hot zone in a proportion correlated with the blast temperature while proportioning the burden and the alkali content thereof in correlation with the proportion of hot gases withdrawn.

In testimony whereof I have hereunto affixed my signature.

K. P. McELROY.